Dec. 15, 1931.  B. WADSTED  1,836,694
METHOD OF CONCENTRATING PHOSPHORIC ACID SOLUTIONS
Filed Jan. 15, 1931
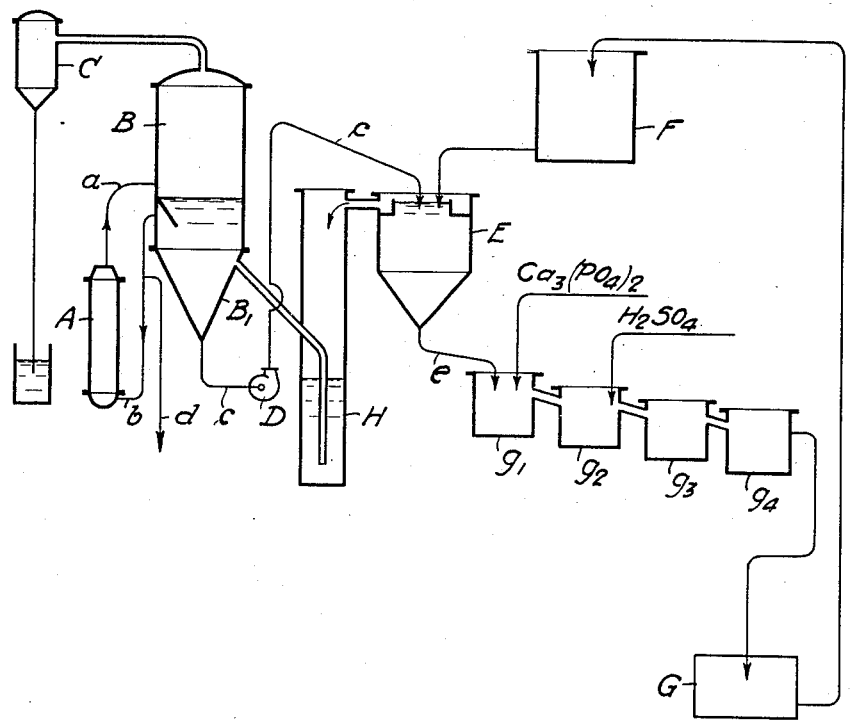
BENGT WADSTED
INVENTOR
ATTORNEY Patented Dec. 15, 1931

1,836,694

UNITED STATES PATENT OFFICE

BENGT WADSTED, OF BERLIN, GERMANY, ASSIGNOR TO KUNSTDÜNGER-PATENT-VERWERTUNGS-AKTIENGESELLSCHAFT, OF GLARUS, SWITZERLAND

METHOD OF CONCENTRATING PHOSPHORIC ACID SOLUTIONS

Application filed January 15, 1931, Serial No. 508,833, and in Sweden January 29, 1930.

When phosphoric acid or a phosphatic solution is produced by dissolving phosphate rock in sulphuric acid or in an acid solution containing alkali or ammonium sulphate the calcium sulphate formed in the process is not completely precipitated but remains to a small percentage dissolved in the solution. In the concentration of the solution by evaporation the calcium sulphate dissolved crystallizes out, generally as semihydrate, $$CaSO_4.1/2H_2O,$$

causing the formation of hard crusts on the heating surfaces of the apparatus used. If the solution is neutralized for instance with ammonia while the calcium sulphate still is present in the solution the calcium is precipitated as insoluble calcium phosphate.

The object of this invention is to render it possible to produce a concentrated phosphoric acid solution essentially free from lime while avoiding the drawbacks hitherto caused by the calcium sulphate dissolved in the phosphoric acid. The invention consists, chiefly in this, that the calcium sulphate crystallizing out during the evaporation process, is continuously removed and returned to the leaching process. In order to prevent the crystallized calcium sulphate from depositing as hard crusts on the heating surfaces of the apparatus, an evaporator is, preferably, used in combination with a heating apparatus through which the solution is brought to circulate and thus is heated whereupon steam is evolved in the evaporator corresponding to the heat accumulated in the heating apparatus. The calcium sulphate crystallizing out in the evaporator forms in this case a suspension but settles rapidly as a sediment. In removing said sediment from the evaporator a part of the concentrated phosphoric acid solution is, of course, also removed. Before the calcium sulphate is returned to the leaching process it is, preferably, mixed with a portion of the weaker phosphoric acid solution to be concentrated, whereupon it is separated from said solution by sedimentation and decantation. The calcium sulphate which now contains a weaker phosphoric acid than at the removal from the evaporator, is then returned to the leaching process, preferably in such manner, that it is mixed with the phosphate rock before the leaching acid is supplied. The phosphoric acid effects in this case a partial dissolving of the phosphate rock which then is completed by the leaching acid later supplied.

In the accompanying drawing I have shown diagrammatically one embodiment of an apparatus adapted for the performance of the process.

Refering now to the drawing; the weak phosphoric acid solution produced in the process is concentrated in an evaporating apparatus consisting of a heater A and an evaporator B the upper part of which is connected to a condenser C. The heater A is connected into a circulation conduit $a, b$ which is connected to the evaporator B at suitable points and is provided with a circulating device (not shown). The main part of the concentrated solution is drawn off through the pipe $d$. The calcium sulphate crystallizing out from the solution in the evaporator B deposits in its lower conical part $B_1$ and is drawn off continuously together with a small portion of the phosphoric acid solution through the pipe $c$ extending from the lowermost part of the cone $B_1$ and is then by means of a pump D forced up to a settling tank E, in which the calcium sulphate is mixed with dilute phosphoric acid from a storing tank F. In the vessel E the calcium sulphate is left to deposit and in order to facilitate its removal the bottom of said vessel is, preferably, conical. From the bottom of the vessel E the deposited calcium sulphate is drawn off through a pipe $e$ to the first of a series of reaction vessels $g_1$ to $g_4$ 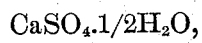 In the vessel $g_1$ also the phosphate rock to be treated is introduced so that the phosphate rock in the first line is attacked by the phosphoric acid accompanying the calcium sulphate returned. From the vessel $g_1$ the reaction mixture flows to the vessel $g_2$ in which sulphuric acid is added and then to the vessels $g_3$ and $g_4$ in which the reaction is completed. The finished solution is separated from the insoluble calcium sulphate and other insoluble residues by filtering or decantation in an apparatus G and is then collected in the tank F. The clear phosphoric acid solution obtained in the settling tank E is drawn off through an overflow to a feeding tank H from which it is continuously supplied to the evaporator B.

As is clear from the above description the calcium sulphate separated from the solution in the concentration process is finally removed from the process together with the calcium sulphate formed at the leaching and does not require any separate washing and its introduction in the leaching process does not cause any inconvenience but on the contrary an advantage as regards the crystal shape of the calcium sulphate formed in the leaching process, inasmuch as the presence of calcium sulphate previously produced facilitates the producing of a coarse crystalline calcium sulphate.

What I claim is:—

1. Method of treating phosphoric acid solution produced by leaching of phosphate rock and containing dissolved calcium sulphate, which comprises concentrating the solution by evaporation, removing the calcium sulphate crystallizing out at the concentration, and returning said calcium sulphate to the leaching process.

2. Method of treating phosphoric acid solution produced by leaching of phosphate rock and containing dissolved calcium sulphate, which comprises concentrating the solution by alternate heating and evaporation, removing the calcium sulphate crystallizing out at the evaporation, and returning said calcium sulphate to the leaching process.

3. Method of treating phosphoric acid solution produced by leaching of phosphate rock and containing dissolved calcium sulphate, which comprises concentrating the solution by alternate heating and evaporation, removing continuously the calcium sulphate crystallizing out at the evaporation together with adhering phosphoric acid, and returning said calcium sulphate to the leaching process.

4. In a process of the kind described, the process which consists in mixing the calcium sulphate slurry separated from the concentrated phosphoric acid with weak phosphoric acid, separating the calcium sulphate from said weak phosphoric acid by sedimentation, and returning the calcium sulphate together with adhering weak phosphoric acid to the leaching process.

5. In a method of the kind described, the process which consists in first mixing the calcium sulphate obtained in the concentration process and adhering phosphoric acid with the phosphate rock to be treated, and then adding a leaching agent capable of liberating phosphoric acid and precipitating the lime content of the phosphate rock as calcium sulphate.

In testimony whereof I have signed my name.

BENGT WADSTED.